United States Patent
Deenadhayalan et al.

(10) Patent No.: US 7,908,512 B2
(45) Date of Patent: Mar. 15, 2011

(54) METHOD AND SYSTEM FOR CACHE-BASED DROPPED WRITE PROTECTION IN DATA STORAGE SYSTEMS

(75) Inventors: Veera A. Deenadhayalan, San Jose, CA (US); Binny Sher Gill, Auburn, MA (US); James Lee Hafner, San Jose, CA (US); Leo Shyh-Wei Luan, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/042,984

(22) Filed: Mar. 5, 2008

(65) Prior Publication Data
US 2009/0228744 A1 Sep. 10, 2009

(51) Int. Cl.
*G06F 11/00* (2006.01)
(52) U.S. Cl. ............................... 714/8; 714/48
(58) Field of Classification Search .......... 714/48
See application file for complete search history.

(56) References Cited

U.S. PATENT DOCUMENTS

| | | | | |
|---|---|---|---|---|
| 5,255,270 A | * | 10/1993 | Yanai et al. | 714/710 |
| 5,408,366 A | * | 4/1995 | Bentley et al. | 360/53 |
| 5,488,702 A | * | 1/1996 | Byers et al. | 726/26 |
| 5,592,618 A | | 1/1997 | Micka et al. | |
| 6,898,036 B2 | * | 5/2005 | Gill et al. | 360/53 |
| 6,931,576 B2 | | 8/2005 | Morrison et al. | |
| 7,020,805 B2 | * | 3/2006 | Talagala et al. | 714/42 |
| 7,353,432 B1 | * | 4/2008 | Talagala et al. | 714/52 |
| 7,454,668 B1 | * | 11/2008 | Yochai et al. | 714/52 |
| 2003/0145270 A1 | * | 7/2003 | Holt | 714/766 |
| 2004/0003316 A1 | * | 1/2004 | Meng et al. | 714/13 |
| 2004/0123032 A1 | * | 6/2004 | Talagala et al. | 711/114 |
| 2004/0153746 A1 | * | 8/2004 | Talagala et al. | 714/8 |
| 2005/0005191 A1 | * | 1/2005 | Judd | 714/5 |
| 2006/0109792 A1 | | 5/2006 | Broadbent | |
| 2006/0179381 A1 | * | 8/2006 | Durica et al. | 714/736 |

OTHER PUBLICATIONS

ZFS, "What is ZFS", What is ZFS? at OpenSolaris.org, http://www.opensolaris.org/os/community/zfs/whatis/, Feb. 29, 2008, pp. 1-2.
Qin Xin, et al., "Reliability Mechanisms for Very Large Storage Systems," Mass Storage Systems & Technologies, (MSST 2003), p. 146, 20th IEEE/11th NASA Goddard Conference.
Schwartz et al., "Disk Scrubbing in Large Archival Storage Systems", Proc. 12th IEEE/ACM Int'l Symp. on MASCOTS, Oct. 2004, http://www.ssrc.ucsc.edu/Papers/schwartz-mascots04.pdf.

(Continued)

*Primary Examiner* — Scott T Baderman
*Assistant Examiner* — Kamini Patel
(74) *Attorney, Agent, or Firm* — Kenneth L. Sherman, Esq.; Michael Zarrabian, Esq.; Myers Andras Sherman & Zarrabian LLP

(57) ABSTRACT

A method and system for cache-based dropped write protection in data storage systems are provided. An implementation involves detecting undetected write errors in a storage system, by writing data to a storage medium from a data cache; maintaining a copy of the data in the data cache until said data on the storage medium is validated or said data needs to be evicted from the data cache; and prior to eviction of said data from the data cache, maintaining metadata for said data in a metadata cache until the data written to the storage medium has been validated against the metadata.

20 Claims, 7 Drawing Sheets

OTHER PUBLICATIONS

RAID 5, Standard Raid Levels, http://en.wikipedia.org/wiki/RAID_5, Feb. 29, 2008, pp. 6-8.

Longitudinal redundancy check (LRC), http://en.wikipedia.org./wiki/Longitundinal_Redundancy_Check, Mar. 5, 2008, pp. 1.

* cited by examiner

| ON DISK Data Block | | Validated | Validation Process | Has Metadata |
|---|---|---|---|---|
| Copy in data cache | | Yes | By readback / data compare | No |
| | | Pending | By readback / data compare (1) | |
| No copy in data cache | | Yes | By readback / data compare before data cache eviction | No |
| | | | By readback / metadata compare after data cache eviction, before metadata cache eviction | |
| | | Pending | By readback / metadata compare, followed by metadata eviction | Yes |

(1) Unvalidated data on disk with copy in data cache may also be evicted after write to disk, and metadata computation/store

FIG. 3

METHOD AND SYSTEM FOR CACHE-BASED DROPPED WRITE PROTECTION IN DATA STORAGE SYSTEMS

BACKGROUND OF THE INVENTION

1. Field of the Invention

The present invention relates generally to data storage and in particular to write protection in storage systems.

2. Background Information

Hard disk drives are designed to store and retrieve data. With increasing capacities and higher densities, disk drives are becoming less reliable in performing such functions. Compared to server class drives (Fibre Channel and Small Computer System Interface (SCSI) drives), the lower cost Serial Advanced Technology Attachment (SATA) or Integrated Drive Electronics (IDE) drives are even less reliable in that regard.

At least three types of errors may occur. A first type involves write errors due to tracking errors. During a write operation, the disk arm carrying a transducer head must align with very accurate precision on a target disk track containing a certain physical block to record new "bits" of write data. However, tracking errors may occur due to head-track misalignment, whereby the data is written to a completely unintended track (known as a Far Off-track Write), or it is written, misaligned near, but not quite on the intended target track and "Falls In The Gap" (known as a Near Off-track Write). In the Far Off-track Write case, two physical blocks are now in error: the intended target block is not overwritten and so it contains stale data, and the unintended overwritten block has lost the data that should be there. In the Near Off-track Write case, one block is now in error: the target block is not correctly overwritten.

A second type of errors also occurs during a write operation when the bits are not changed on the intended disk track (e.g., the signal is too weak to change the magnetic setting of the bits on the disk platter). In this case, the data remaining on the disk is stale, i.e., not up-to-date with the write commands issued to the drive. These errors are called "Dropped Writes" because the bits are dropped "on the floor" and not on the platter.

Both the first and second types of write errors above are called "Undetected Write Errors" because the disk drive drops the write data in the wrong disk platter location and does not itself detect the problem.

A third type of errors is due to misaligned head placement on disk tracks when reading data. In this case, the disk drive may read the "bits" from a completely unintended track (Far Off-track Read) or from the gap (Near Off-track Read) and return incorrect data to the user or application. In addition, if the disk drive reads tracks correctly, but on the unintended target of a Far Off-track Write, incorrect data will again be returned to the user or application. In all the cases described, the disk drive typically does not detect a problem and returns a "SUCCESS" status to the user, host or application. Other error scenarios may also occur where the disk returns a SUCCESS status but the user or application gets incorrect data. All such write or read errors are termed Undetected Disk Error, or UDE.

Because the disk drive itself does not detect the errors in these cases, higher level methods are required to detect these errors at the time data is read from the disk (the possibility to detect during a write has already passed and the data cannot be checked on the disk without reading). Some of these errors are persistent, that is, every read attempt will return incorrect data (e.g., reads that occur after a dropped write where stale data is left on the disk or after a far off-track write); others are transient, that is, successive read attempts may or may not return correct data (e.g., correct writes followed by inconsistent off-track head alignment during reads, or reads after near off-track writes).

BRIEF SUMMARY OF THE INVENTION

A method and system for cache-based dropped write protection in data storage systems are provided. An embodiment involves detecting undetected write errors in a storage system, by: writing data to a storage medium from a data cache; maintaining a copy of the data in the data cache until said data on the storage medium is validated against the data cache or until there arises a need to evict the data from the data cache; and prior to eviction of said data from the data cache, maintaining metadata for said data in a metadata cache until the data written to the storage medium has been validated against the metadata cache.

Validation may include reading back the data from the storage medium, and comparing the read data to said data maintained in the data cache; and if the read data compares properly with the data maintained in the data cache, then marking the data in the cache as eviction eligible, otherwise logging an error.

Maintaining a copy of the data in the data cache may include maintaining a copy of the data in the data cache until said data on the storage medium is validated or said copy of the data is evicted from the data cache. Maintaining a copy of the data in the data cache may also include computing metadata for the data, storing the metadata in the metadata store, and evicting the data from the cache as needed. Validating the data may involve performing metadata validation by reading back said data from the storage medium, computing metadata for the data blocks read from the storage medium, comparing the computed metadata with the metadata from the metadata cache associated with said data, and if the metadata compare properly, then removing metadata from the metadata cache, else reporting error. Validating the data may further include checking if neither the data cache nor the metadata cache contains metadata for the data, and if not either, then declaring the data as valid.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 3 shows an example validation process according to the invention.

DESCRIPTION OF THE PREFERRED EMBODIMENTS

Figure 1:
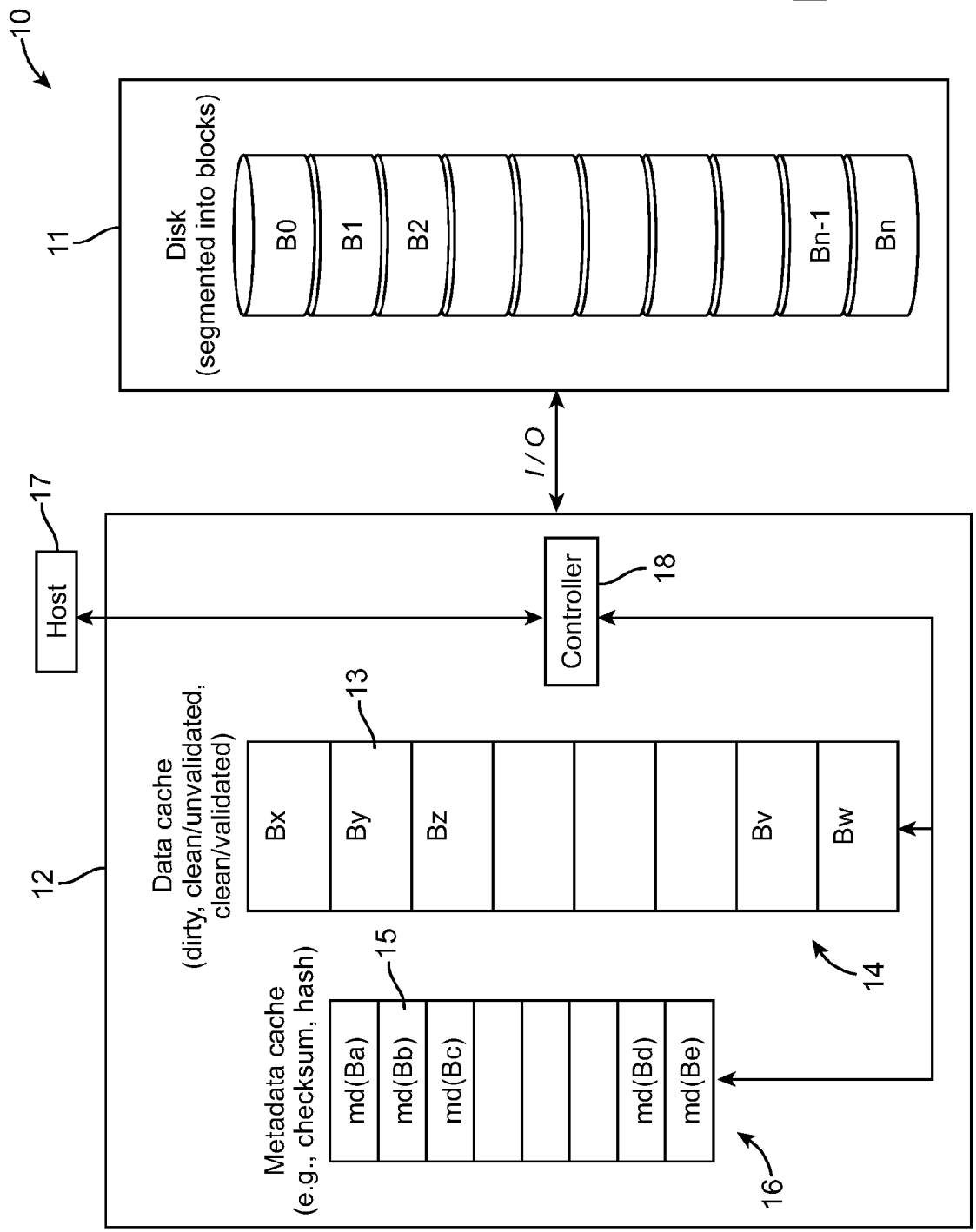
FIG. 1 illustrates a functional block diagram of a system for cache-based dropped write protection in data storage systems, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of disk-based data storage systems, as well as operation and/or component parts thereof. While the following description will be described in terms of a disk data storage system for clarity and to place the invention in context, it should be kept in mind that the teachings herein may have broad application to all types of magnetic data recording and data storage.

The invention provides a method and system for cache-based dropped write protection in data storage systems. One implementation involves a cache-based dropped write protection process for persistent errors, which may also detect transient errors if they occur during a data validation phase. The process utilizes cache-based and hash-based schemes.

A data cache maintains a copy of data blocks written to disk by a write operation until the data blocks on disk are validated, or until the data blocks in the cache need to be evicted from the cache. The data blocks in the cache are used to validate the data blocks written to the disk. When the data blocks needs to be evicted from the cache prior to validation, then a non-volatile metadata store (e.g., metadata cache, memory) may be used to maintain a checksum (e.g., hash) of those data blocks not yet validated. The metadata (md) is then used for validating the data blocks written to disk against the metadata. Instead of checksums, other metadata such as a timestamp or a sequence number for the data blocks may be used.

Writing data blocks to disk may involve a lazy write to disk including: writing data blocks from cache to disk and maintaining in cache, without immediate eviction. Writing data blocks to disk may also involve stressed write to disk including: writing data blocks from cache to disk; computing metadata for the data blocks, storing the metadata, and evicting the data blocks from the cache.

After a lazy write operation, a validation operation may include: reading back the data blocks from disk and comparing to the copy of data blocks in cache; if the read data blocks and the data blocks in the cache compare properly, then mark the data blocks in the cache as eviction eligible, otherwise, reassign the data blocks in the cache to another lazy write operation and then a validation operation.

After a stressed write operation, a validation operation may involve metadata validation including: reading back the data blocks from the disk; computing metadata for the data blocks read from the disk; comparing computed metadata for the data blocks read from the disk with the metadata of the data blocks in the cache; if the metadata compare properly, then remove the metadata from the metadata store, else mark the read data blocks as bad; reassign the data blocks in the cache to another stressed write operation and then a validation operation.

Referring to the function block diagram in FIG. 1, an example implementation of a system 10 for detecting and locating Undetected Disk Errors (UDEs) is described below. The system 10 performs read/write operations (I/O) to the disk drive 11. The system 10 includes a data management module 12 including a cache 14, a non-volatile metadata store 16 and a controller 18. The controller 18 operates such that the cache 14 maintains a copy of the data blocks 13 until the data blocks need to be evicted from the cache, and the metadata store 16 maintains a checksum 15 (e.g., hash) of those data blocks not yet validated. The term "block" refers to a unit of data on which the checksum is computed. This may be a disk sector (e.g., 512 bytes) or a cache page size (e.g., 4 KB) or some other unit of data appropriate for a particular implementation. Specifically, the controller 18 implements operations including Host write, Host read, Validation against the cache, and Validation against the metadata store, as described in more detail below.

Host Write

Figure 2:
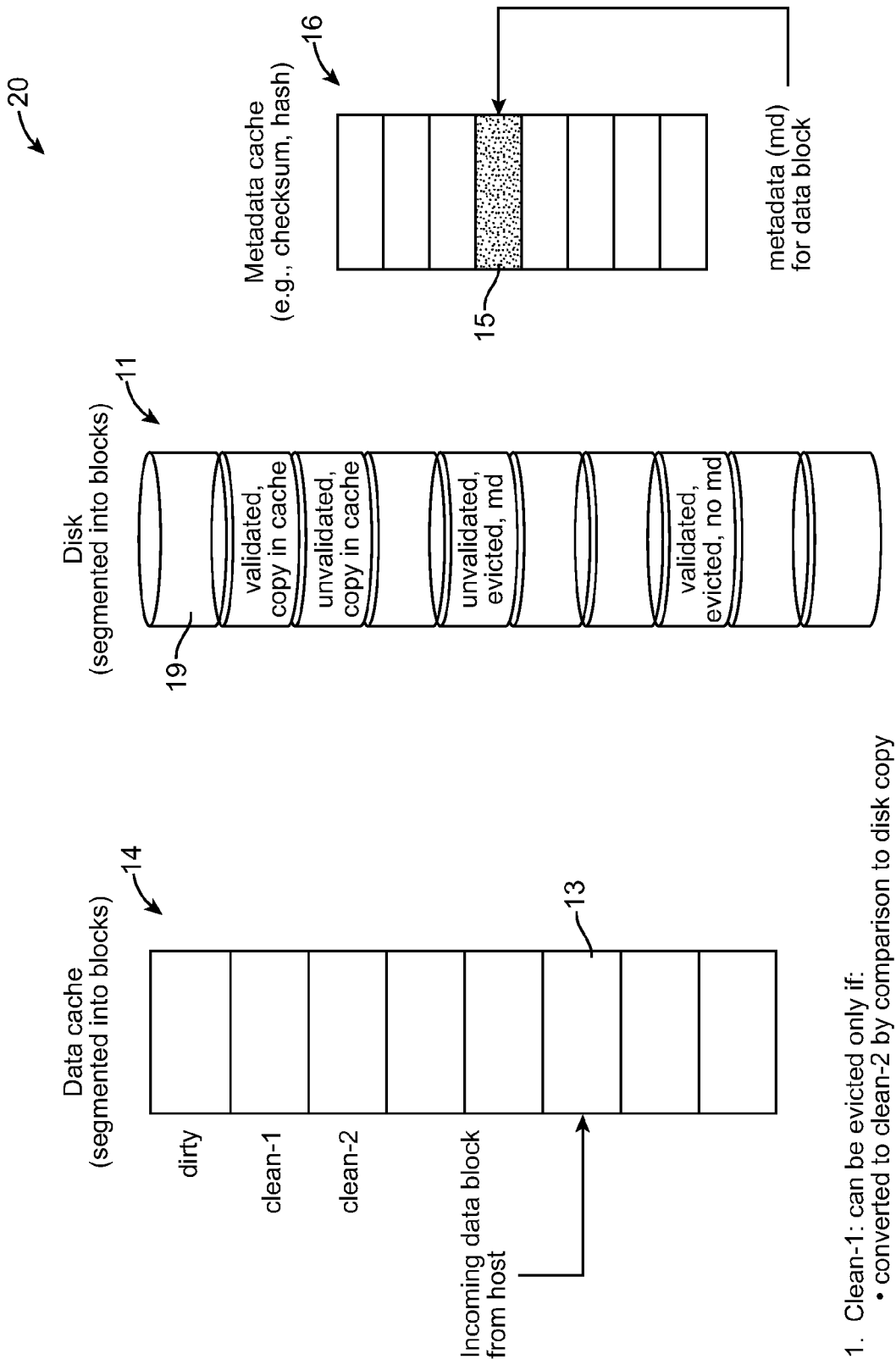
FIG. 2 shows an example operation of the system of FIG. 1.

Now also referring to the example data flow diagram 20 in FIG. 2 and the validation process table 30 in FIG. 3, in conjunction with FIG. 1, in a write command one or more data blocks are received from a host 17 by the controller, and each received data block is stored in the cache 14 as a data block 13. Synchronously or asynchronously at some later time, each data block 13 is copied from the cache 14 to the disk 11 as a block 19. If there is no stress on the cache 14 (e.g., cache page eviction rate is slower than the rate of validation), then a data block 13 is maintained in the cache 14. If there is stress on the cache (e.g., cache page eviction rate is higher than the rate of validation), then metadata (md) 15 for the data block 19 is computed (e.g., data block 19 is compressed into a hash (or checksum)), and the metadata 15 is stored in the non-volatile metadata store 16.

Host Read

The host 17 sends a read operation requesting one or more data blocks (previously written to disk by write operations). The cache 14 is checked for each data block. If the read operation from the host results in a cache hit (i.e., requested data block is in the cache), then valid data is served from the cache 14 and no other action is required.

If there is no cache hit for a requested data block 19, then it is determined if the requested data block has been validated on disk (i.e., it is validated if there is no associated metadata value 15 for the requested data block 19 in the metadata store 16). If the requested data block 19 has been validated (i.e., there is no associated metadata value 15 for the requested data block 19 in the metadata store 16), the data block 19 is read from the disk and returned to the host (having been validated sometime earlier). If the requested data block 19 on the disk has not yet been validated (i.e., there exists associated metadata 15 for the requested data block 19 in the metadata store 16), then the data block 19 is read from the disk, a hash or checksum is computed for the data block 19, and compared with the associated value 15 in the metadata store 16. If comparison of the computed metadata for the read data block 19 agrees with the associated metadata value 15 in the metadata store 16, then the read data block 19 is valid and is returned to the host (the associated value metadata value 15 for that data block is cleared from the metadata store 16). If there is a miscompare, then error handling is invoked (e.g., returning a bad status to the host and marking the data as lost, or integration with RAID (redundant array of independent disk drives) layers to attempt a reconstruct of the data).

Validation Against the Cache

If a data block 13 is to be evicted from the cache 14, and there is light load on the system, then a read of the corresponding data block 19 from the disk may be invoked, wherein a memory comparison between the blocks 13 and 19 is performed to validate that the disk copy 19 matches the cache copy 13. If validated, then the data block 13 can be evicted from the cache. If there is a miscompare, then error handling can be invoked (e.g., rewriting data to the disk or to a different location on the disk, e.g., reassign blocks). No interaction with the metadata store is required in this case. In FIG. 2, the "dirty" label for a data block in the cache 14 indicates that the data has not yet been written to disk 11. The "clean-1" label for a data block in the cache 14 indicates that the data has been written to the disk 11 but the disk copy has not yet been validated. The "clean-2" label for a data block in the cache 14 indicates that the data has been written to disk 11 and the disk copy has been validated.

Validation Against Metadata Store

Periodically unvalidated data blocks 19 may be read from the disk, and metadata computed for them for comparison with the corresponding values 15 in the metadata store 16. If comparison of the computed metadata for a read data block 19 agrees with the corresponding value 15 in the metadata store 16, then the value 15 is removed from the metadata store 16 (indicating that the copy 19 on disk is valid). A miscompare may invoke error handling (e.g., logging an error and marking the data as lost, or integration with RAID layers to attempt a reconstruct of the data).

Preferably, the controller further implements moving the transducer head between the time of the write to disk and the next validation read (that will validate against either the cache or metadata store).

Metadata

Computation of metadata, such as hash or cyclic redundancy check (CRC) values, for the data blocks in conjunction with every write operation and every validation comparison, may involve using a timestamp, sequence number or phase change counter. Additional protections may be obtained with metadata that contains a value that depends on some logical or physical address (LBA) of the data. Because these types of metadata (timestamps and address-based) are not computed from the data itself, they must be stored in the metadata store for reference and also a copy must be stored atomically with the data itself. The data blocks 13 may be assumed "oversized", e.g., 520 byte physical sector on disk to store 512 bytes of user data (other sizes of oversized sectors are possible for 512 bytes of user data or for different "block" sizes). That is, the user data blocks contain one or more additional bits or bytes of space where metadata can be stored atomically with the data. For the purpose of exposition only, it is further assumed that such metadata contains only a sequence number. The controller 18 implements the following steps:

1. When a data block 13 must be evicted from the cache 14, new metadata is computed for that data block 13. The new metadata is stored in the metadata store 16, and appended into the extra bytes of the oversized data block 13, whereby the data block 13 including data and new metadata are written to the disk block 19. The new metadata may be computed as follows:
   a. If there is a sequence number in the metadata store 16 for the specified data block 13, then the sequence number can be incremented.
   b. If there is no sequence number in the metadata store 16 for the specified data block 13, then the existing sequence number is not available (without reading the disk). In this case, the sequence number is initialized or re-initialized.
2. When a block 19 is read back from the disk for validation against the metadata store 16, the metadata in the block 19 is compared against that in the associated metadata in the metadata store 16.
3. Validation against the cache copy, and eviction rules remain the same as above. There is no need to compute checksums on the data each time it is written and read from the disk.

There are a number of alternatives for initializing (or re-initializing) a sequence number when the current sequence number is not available (not in the metadata store). For example, a fixed value can be used, or a random or pseudo-random value may be used. Another alternative is to use a clock value (or a truncated clock value). Yet another alternative is to use a checksum of the data as the initializing value. This alternative avoids computation of checksum in the following scenarios: (a) when two or more writes to the same disk block occur prior to a validation of the copy on disk (because the old value is available to increment) and (b) when validating data from disk against the metadata store (because the value is stored with the data as well).

Yet another alternative for initializing the sequence number is to use a global sequence number. This sequence number can be global at the storage system level, or can be scoped on a finer granularity, such as the logical volume level or even on a per disk basis. When a write occurs in the system and the old sequence number is not available, the global value is incremented and used as the initializing value. The sequence number value for this particular write is stored in the metadata store as the metadata associated with the disk block. As above, the sequence number is also stored in the oversized blocks 19 on the disk. The size of the sequence number value must be sufficient to reduce the likelihood of re-use collisions and it must depend on the distribution (location and rate) of I/Os to the disks within the system and the likelihood of UDEs. An example value that is 4 bytes (32 bits) may be sufficient in most systems. Another implementation may involve marking (e.g., with one bit) whether the value of the timestamp was an initialized value or an incremented value.

A variation for initializing the sequence number value uses the checksum of the data in the metadata and the value stored on disk is a special reserved value (that is not used as a value for an incremented sequence number). When that special reserved value is read from the disk for a metadata store validation, it indicates that the value in the metadata store is a checksum and so comparison can occur only after a second checksum computation is performed with the data read from disk. This allows for fewer bits in the stored sequence number and more bits in the metadata store checksum values. More bits in the checksum values reduce collision probabilities. Fewer bits stored in the oversized sectors reduce storage overhead.

The invention merges data cache technology and metadata store technology, by splitting resource allocations between the two technologies, and providing a trade-off of costs (mostly in excess memory requirements) versus error recoverability. The resource allocation may include, for example:
(a) a fixed allocation between data cache and metadata store, based on projections of error events, projected workload patterns, and recoverability requirements.
(b) an adaptive allocation between data cache and metadata store, based on history of detected errors (e.g., more events suggest shifting resources to the data cache), but also current workload patterns (more writes places additional stresses on the data cache, and so suggests resources shift to the metadata store).

Data cache recovery is preferred because a copy of the correct data is available in the data cache. However, for an implementation in conjunction with a RAID component in the system, errors detected by the metadata store may be recovered if there is coordination with the recovery algorithms of the RAID component.

Figure 4:
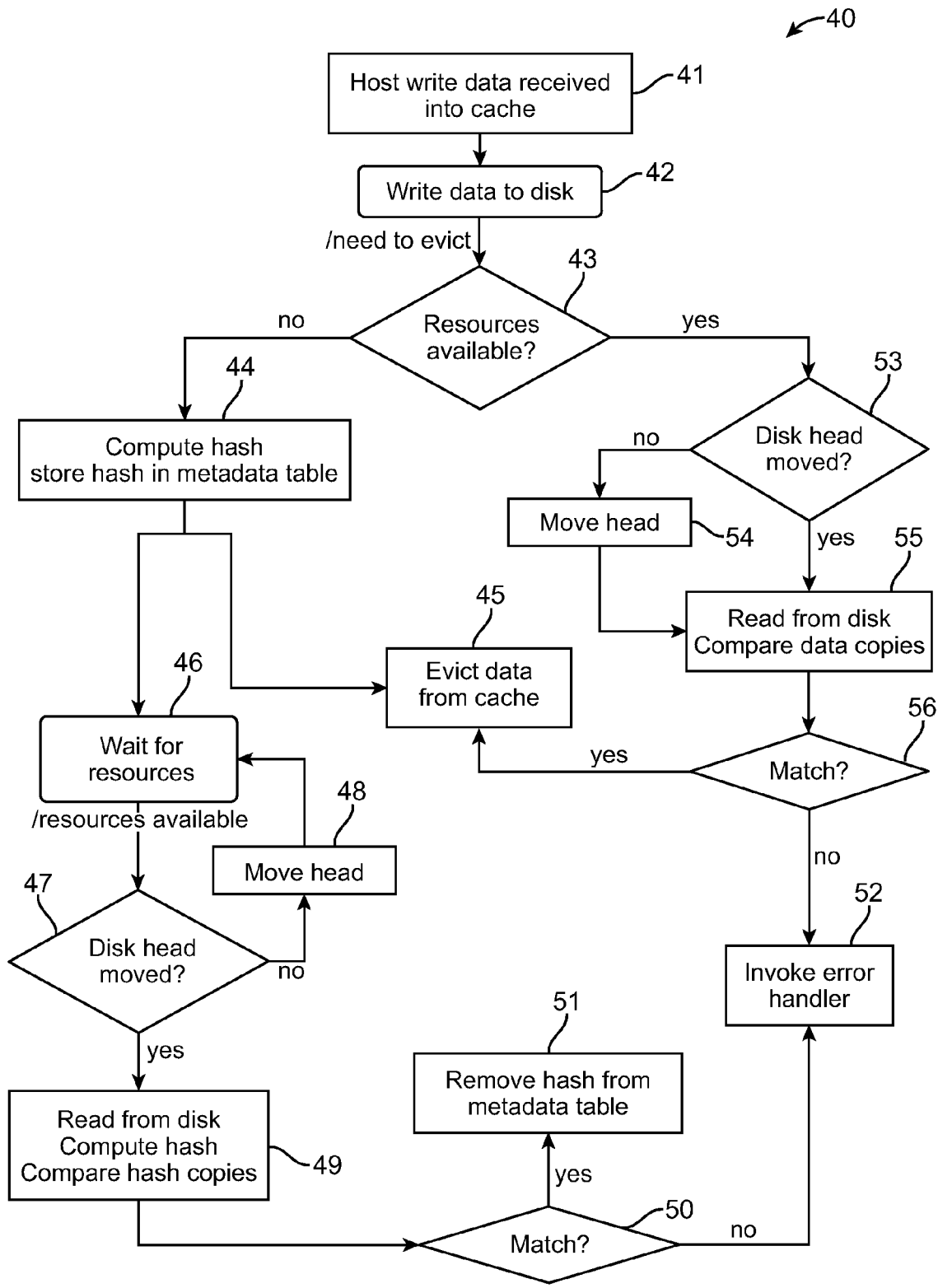
FIGS. 4-7 shows flowcharts of the steps of example dropped write protection processes, according to the invention.
Figure 5:
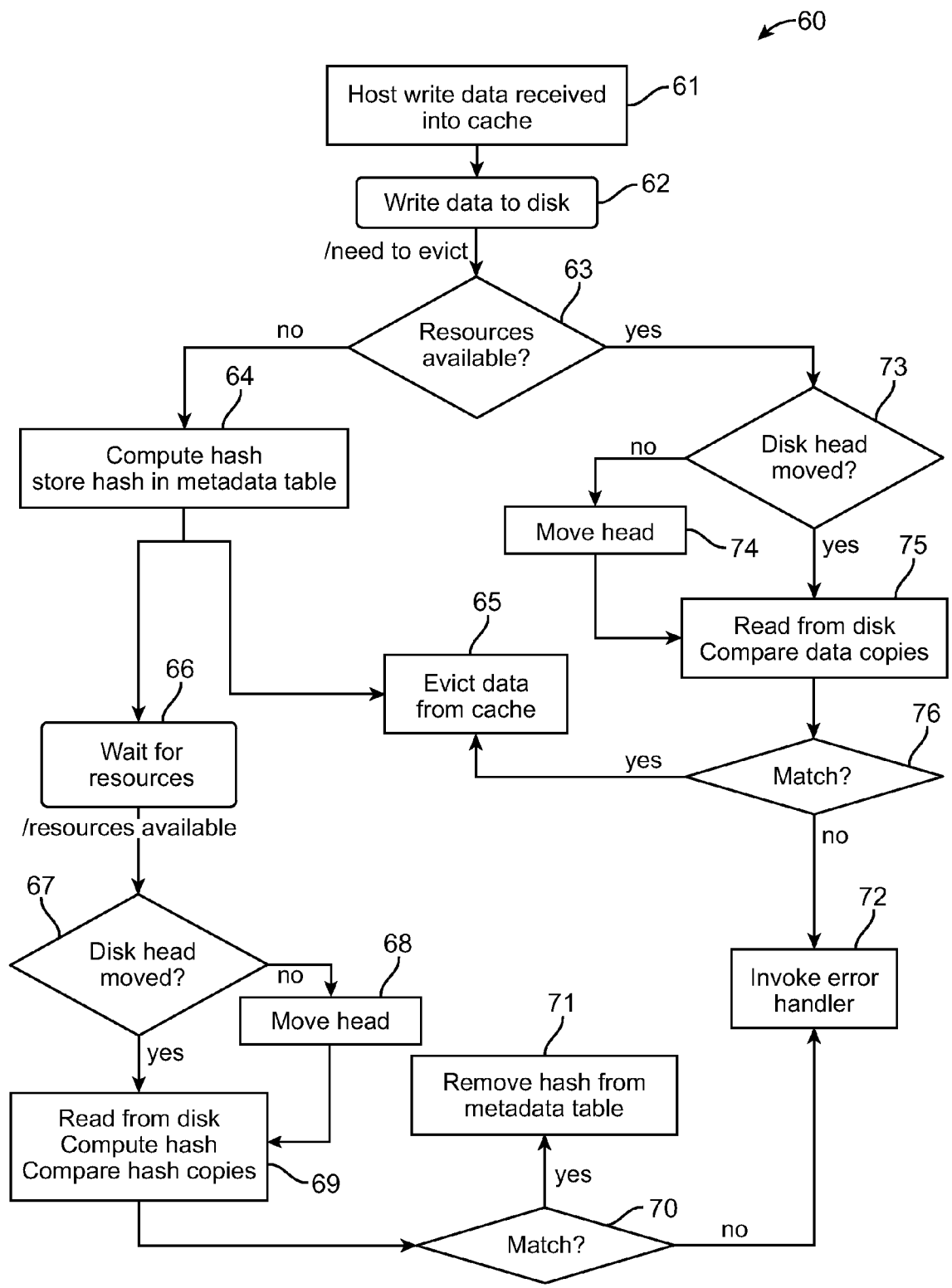
Figure 6:
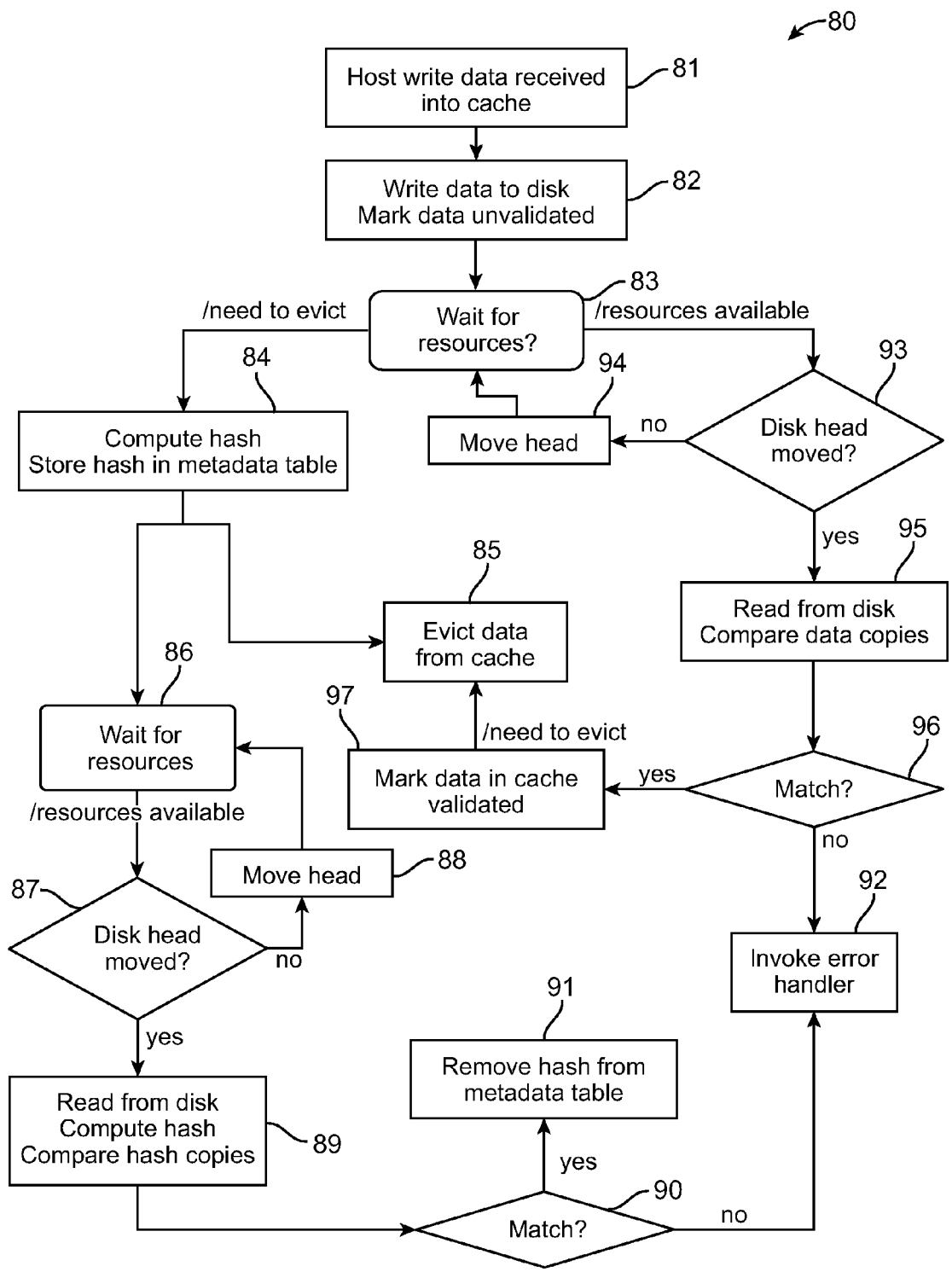
Figure 7:
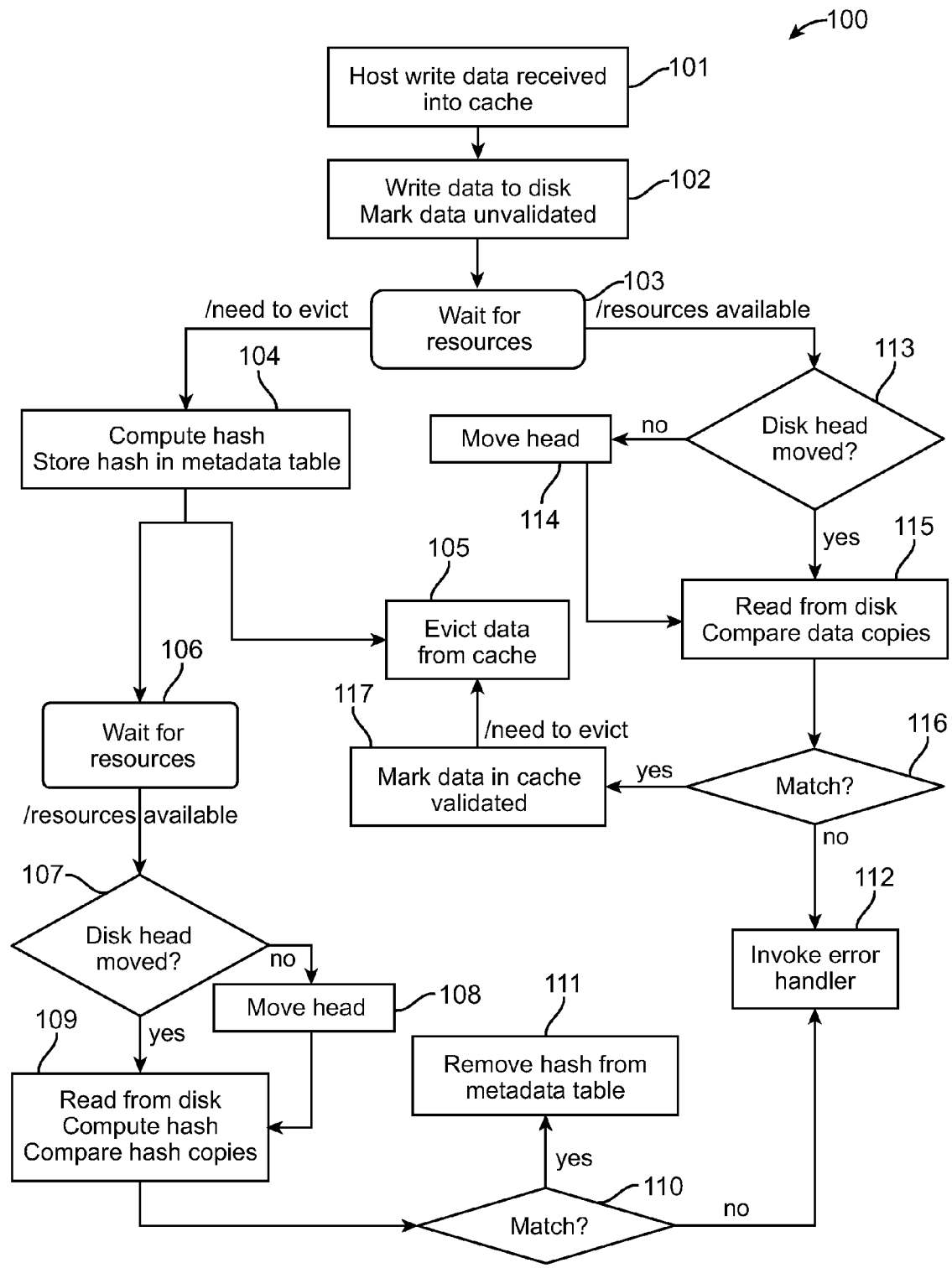

FIGS. 4-7 show flowcharts of different embodiments of a write process in accordance with the invention. In FIGS. 4-7, the "/<text>" is a trigger event that causes leaving a wait state (a wait state has rounded corners). Furthermore, the inquiry "Resources available?" or the trigger event "/resources available" indicates a determination by the system that a particular action can be initiated and completed at that time within system constraints. Resources include, but are not limited to, available memory and memory bandwidth, and also time for processing and disk operations. In FIGS. 6-7, the term "validated" is used to indicate that the data blocks on the storage medium have been validated using the data cache (this is in contrast to the normally used meaning of "valid" meaning that the blocks contain legitimate data values (i.e., user data and not garbage bytes)). FIGS. 4-7 are now described in more detail below.

FIG. 4 shows a flowchart of a write process 40 according to an embodiment of the invention. The main validation action on the cache held data is only triggered at the time when the data needs eviction (stressed write). The process 40 includes the following steps:

Step 41: Host write data received into the cache.
Step 42: Write data to disk. Go to step 43 upon need to evict cache.
Step 43: Resources available? If no, go to step 44, else go to step 53.
Step 44: Compute hash; store hash in metadata table.
Step 45: Evict Data from cache. End.
Step 46: Wait for resources. Go to step 47 upon resources becoming available.
Step 47: Disk head moved? If no, go to step 48, else go to step 49.
Step 48: Move head; go back to step 46.
Step 49: Read from disk; compute hash; compare hash copies.
Step 50: Match found? If yes, go to step 51, else go to step 52.
Step 51: Remove hash from metadata table. End.
Step 52: Invoke error handler. End.
Step 53: Disk head moved? If no, go to step 54, else go to step 55.
Step 54: Move head.
Step 55: Read from disk; compare data copies.
Step 56: Found match? If no, go to step 52, else go to step 45.

In the background task that validates the metadata table, the process 40 waits in block 46 for resources for a single disk action, either a read or a disk head move (not both). In the "Resources available?" decision block 43, the decision is "yes" if there are resources for one or two disk actions (either read or both head move and read).

FIG. 5 shows a flowchart of another write process 60 according to an embodiment of the invention, including the following steps:

Step 61: Host write data received into the cache.
Step 62: Write data to disk. Go to step 63 upon need to evict cache.
Step 63: Resources available? If no, go to step 64, else go to step 73.
Step 64: Compute hash; store hash in metadata table.
Step 65: Evict data from cache. End.
Step 66: Wait for resources. Go to step 67 upon resources becoming available.
Step 67: Disk head moved? If no, go to step 68, else go to step 69.
Step 68: Move head; go to step 69.
Step 69: Read from disk; compute hash; compare hash copies.
Step 70: Match found? If yes, go to step 71, else go to step 72.
Step 71: Remove hash from metadata table. End.
Step 72: Invoke error handler. End.
Step 73: Disk head moved? If no, go to step 74, else go to step 75.
Step 74: Move head.
Step 75: Read from disk; compare data copies.
Step 76: Found match? If no, go to step 72, else go to step 65.

In the background task that validates the metadata table, the process 60 at wait state 66 assumes that enough resources indicates two disk actions can take place, if needed, so the head can be moved if necessary. In the "Resources available?" decision diamond 63, the decision is "yes" if there are resources for one or two disk actions (either read or both head move and read).

Alternatively, the main validation may also occur either as triggered by an eviction need or when resources are available. In effect, this is a pro-active validation prior to an eviction need. A state of the data in cache, as validated or not, is maintained. If an eviction is needed and the validation has occurred, then the eviction can happen immediately. If the validation has not occurred, the process follows the same path as in FIGS. 4-5. FIG. 6 shows a flowchart of an example of such an alternative process 80 according to an embodiment of the invention, including the following steps:

Step 81: Host write data received into the cache.
Step 82: Write data to disk; make data unvalidated.
Step 83: Wait for resources. Upon need to evict cache then go to step 84, else upon resources become available then go to step 93.
Step 84: Compute hash; store hash in metadata table.
Step 85: Evict data from cache. End
Step 86: Wait for resources. Upon resources becoming available go to step 87.
Step 87: Disk head moved? If no, go to step 88, else go to step 89.
Step 88: Move head; go to step 86.
Step 89: Read from disk; compute hash; compare hash copies.
Step 90: Match found? If yes, go to step 91, else go to step 92.
Step 91: Remove hash from metadata table. End.
Step 92: Invoke error handler. End.
Step 93: Disk head moved? If no, go to step 94, else go to step 95.
Step 94: Move head; go back to step 83.
Step 95: Read from disk; compare data copies.
Step 96: Found match? If yes, go to step 97, else go to step 92.

FIG. 7 shows a flowchart of another example of such an alternative process 100 according to an embodiment of the invention, including the following steps:

Step 101: Host write data received into the cache.
Step 102: Write data to disk; make data unvalidated.
Step 103: Wait for resources. Upon need to evict cache then go to step 104, else upon resources become available then go to step 113.
Step 104: Compute hash; store hash in metadata table.
Step 105: Evict data from cache. End.
Step 106: Wait for resources. Upon resources becoming available go to step 107.
Step 107: Disk head moved? If no, go to step 108, else go to step 109.
Step 108: Move head; go to step 109.
Step 109: Read from disk; compute hash; compare hash copies.
Step 110: Match found? If yes, go to step 111, else go to step 112.
Step 111: Remove hash from metadata table. End.

Step 112: Invoke error handler. End.
Step 113: Disk head moved? If no, go to step 114, else go to step 115.
Step 114: Move head; go to step 115.
Step 115: Read from disk; compare data copies.
Step 116: Found match? If yes, go to step 117, else go to step 112.

The processes 80 and 100 differ on whether enough resources implies up to two disk actions (for process 100) or just one (for process 80). In process 80, the "/resources available" trigger at both wait states 83 and 86 implies resources for only one disk action (either read or head move). In process 100, the "/resources available" trigger at both wait states 103 and 106 implies resources for up to two disk actions (either read or both head move and read).

The preferred embodiment of this invention comprises a data cache that is non-volatile. In that case, if the power supply were to fail, the data in the data cache is maintained so that when power is restored the data on the storage medium can still be validated against the data in the data cache. However, if the data cache is volatile, there are a number of embodiments of the invention that can maintain the ability of the system to validate data after a power cycle. In one embodiment with sufficient battery backup, when power is lost the system can compute metadata for each of the blocks in the data cache and store that metadata in the (non-volatile) metadata cache. On power restore, the system can use the metadata cache to validate the data on the storage medium that had not yet been validated by the data cache. In another embodiment with volatile data cache and insufficient battery backup, the system may pre-compute metadata and store it in the metadata cache as data is either received into the data cache or as part of the process of writing the data to the storage medium. As in the previous embodiment, when power is lost the metadata cache is available on power restore to validate any data on the storage medium that was not validated against the data cache. In addition, data in the data cache can still be used to validate data on the storage medium (providing more effective error recovery than only the metadata cache validation method, and so is preferred); when the data is declared valid using the data cache, the metadata for that data in the metadata store can be deleted. Furthermore, in this embodiment, when data needs to be evicted from the cache, it can be evicted immediately because the metadata has already been pre-computed and stored in the metadata cache.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of detecting undetected write errors in a storage system, comprising:
 writing data to a storage medium from a data cache;
 validating the data by validating the data cache and the metadata cache,
 wherein validating the data cache includes:
  maintaining a copy of the data in the data cache until said data on the storage medium is validated against the copy of the data in the data cache or until eviction of data from the cache is required; and
  prior to eviction of said data from the data cache, maintaining metadata for said data in a metadata cache until the data written to the storage medium has been validated against the metadata; and
 wherein validating the metadata cache includes:
  periodically reading unvalidated data blocks from the storage medium;
  computing metadata values for the unvalidated data blocks;
  comparing the computed metadata values to corresponding metadata values stored in the metadata cache for the unvalidated data blocks;
  if the computed value and corresponding value matches, then removing the value from the metadata cache,
  otherwise, invoking error handling for the unvalidated data blocks.

2. The method of claim 1, wherein the metadata cache is maintained in non-volatile memory.

3. The method of claim 1, wherein the data cache is maintained in non-volatile memory.

4. The method of claim 1, wherein further comprising using a checksum as said metadata.

5. The method of claim 1 further comprising using version numbers as metadata,
 utilizing a version number initialization for sequence numbers; and
 maintaining a copy of said version number with the data on the storage medium for validation.

6. The method of claim 1, wherein the storage medium comprises one or more data disks.

7. The method of claim 1 further comprising validating the data on the storage medium by performing data cache validation including:
 reading back the data from the storage medium, and comparing the read data to said data maintained in the data cache; and
 if the read data compares properly with the data maintained in the data cache, then marking the data in the cache as eviction eligible, otherwise reporting error.

8. The method of claim 1 further comprising
 determining if cache page eviction from the data cache exceeds a validation rate of the data cache;
 if it is determined that the cache page eviction from the data cache exceeds the validation rate of the data cache, then computing metadata values for the data, and storing the metadata values in the metadata cache, otherwise maintaining the data in the data cache.

9. The method of claim 1, wherein validating the data further includes checking if the data cache contains a copy of the data and if the metadata cache contains metadata for the data, and if not both, then declaring the data as valid.

10. An apparatus for detecting undetected write errors in a storage system, comprising:
 a data cache;
 a metadata cache; and
 a controller configured for writing data to a storage medium from the data cache, and validating the data cache and the metadata cache, wherein the controller validates the data cache by:
  maintaining a copy of the data in the data cache until said data on the storage medium is validated against the copy of the data in the data cache or until eviction of data from the cache is required;
 wherein prior to eviction of said data from the data cache, the controller maintains metadata for said data in the metadata cache until the data written to the storage medium has been validated against the metadata; and the controller validates the metadata cache by:
  periodically reading unvalidated data blocks from the storage medium; and comparing computed metadata values to corresponding metadata values stored in the metadata cache for the unvalidated data blocks for validating the meta data cache.

11. The apparatus of claim 10, wherein the metadata cache is maintained in non-volatile memory.

12. The apparatus of claim 10, wherein the data cache is maintained in non-volatile memory.

13. The apparatus of claim 10, wherein the controller is further configured for using a checksum as said metadata.

14. The apparatus of claim 10, wherein the controller is further configured for using version numbers as metadata, utilizing a version number initialization for sequence numbers, and maintaining a copy of said version number with the data on the storage medium for validation.

15. The apparatus of claim 10, wherein the storage medium comprises one or more data disks.

16. The apparatus of claim 10, wherein the controller is further configured for reading back the data from the storage medium, and comparing to the read data to said data maintained in the data cache; and if the read data compares properly with the data maintained in the data cache, then marking the data in the cache as eviction eligible, otherwise reporting an error.

17. The apparatus of claim 10, wherein the controller is further configured for validating the data on the storage medium by performing metadata cache validation including:
    computing metadata values for the unvalidated data blocks read from the storage medium; and
    if the computed metadata values and corresponding values match, then removing the values from the metadata cache,
    otherwise, invoking error handling for the unvalidated data blocks.

18. The apparatus of claim 10, wherein the controller is further configured for validating the data by checking if the data cache contains a copy of the data and if the metadata cache contains metadata for the data, and if not both, then declaring the data as valid.

19. A data storage system, comprising:
    a data storage medium;
    a data cache;
    a metadata cache; and
    a controller configured for writing data to a storage medium from the data cache, validating the data by validating the data cache and the metadata cache, wherein validating the data cache includes:
        maintaining a copy of the data in the data cache until said data on the storage medium is validated against the copy of the data in the data cache or until eviction of data from the cache is required;
    wherein prior to eviction of said data from the data cache, controller maintains metadata for said data in the metadata cache until the data written to the storage medium has been validated against the metadata, for detecting undetected write errors; and
    validating the metadata cache includes:
        periodically reading unvalidated data blocks from the storage medium;
        comparing computed metadata values to corresponding metadata values stored in the metadata cache for the unvalidated data blocks to validate the metadata cache.

20. The data storage system of claim 19, wherein the controller is further configured for using version numbers as metadata, utilizing a version number initialization for sequence numbers, and maintaining a copy of said version number with the data on the storage medium for validation.

* * * * *

UNITED STATES PATENT AND TRADEMARK OFFICE
CERTIFICATE OF CORRECTION

| | | |
|---|---|---|
| PATENT NO. | : 7,908,512 B2 | Page 1 of 1 |
| APPLICATION NO. | : 12/042984 | |
| DATED | : March 15, 2011 | |
| INVENTOR(S) | : Deenadhayalan et al. | |

It is certified that error appears in the above-identified patent and that said Letters Patent is hereby corrected as shown below:

Title Page 1, column 1, Item 75: "Veera A. Deenadhayalan" should be corrected to read --Veera W. Deenadhayalan--.

Signed and Sealed this

Fourth Day of October, 2011

David J. Kappos
*Director of the United States Patent and Trademark Office*